United States Patent
Huang

(10) Patent No.: US 7,619,231 B2
(45) Date of Patent: Nov. 17, 2009

(54) LASER-BEAT-WAVE PHOTOCATHODE ELECTRON ACCELERATOR AND ELECTRON RADIATION APPARATUS USING THE SAME

(75) Inventor: Yen-Chieh Huang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 127 days.

(21) Appl. No.: 11/848,156

(22) Filed: Aug. 30, 2007

(65) Prior Publication Data

US 2009/0059969 A1  Mar. 5, 2009

(51) Int. Cl.
*G21G 4/00* (2006.01)
*H01S 3/09* (2006.01)

(52) U.S. Cl. .......... 250/493.1; 372/73; 372/74

(58) Field of Classification Search ........ 372/69–74; 250/493.1
See application file for complete search history.

(56) References Cited

U.S. PATENT DOCUMENTS

| 5,623,493 | A  | * | 4/1997  | Kagemoto       | 370/397 |
|-----------|----|---|---------|----------------|---------|
| 6,311,559 | B1 | * | 11/2001 | Maruyama et al.| 73/655  |
| 7,085,352 | B2 | * | 8/2006  | Dunham         | 378/122 |
| 7,310,408 | B2 | * | 12/2007 | Filkins et al. | 378/119 |
| 2006/0002715 | A1 | * | 1/2006 | Igarashi et al.| 398/152 |

* cited by examiner

*Primary Examiner*—Minsun Harvey
*Assistant Examiner*—Phillip Nguyen

(57) ABSTRACT

An electron radiation apparatus is provided. The electron radiation apparatus includes a beat-wave laser system generating a laser beat wave, an electron emitter emitting a density-modulated electron current induced by the laser beat wave, an electron accelerator accelerating the density-modulated electron current and generating a periodically bunched electron beam, and a radiation device receiving the periodically bunched electron beam and generating an electron radiation with a radiation frequency matched to one of the harmonics of the bunching frequency of the periodically bunched electron beam.

18 Claims, 7 Drawing Sheets

LASER-BEAT-WAVE PHOTOCATHODE ELECTRON ACCELERATOR AND ELECTRON RADIATION APPARATUS USING THE SAME

FIELD OF THE INVENTION

The present invention relates to a photocathode electron accelerator, and, in particular, to an electron radiation apparatus using a photocathode electron accelerator excited by a laser beat wave.

BACKGROUND OF THE INVENTION

An electron accelerator is a powerful tool for fundamental and applied research. One important application of an electron accelerator is on the generation of electromagnetic radiation. A typical electron radiation apparatus consists of three major components, an electron emitter, an electron accelerator, and a radiation device. Low-energy electrons are generated by the electron emitter and further accelerated to acquire high energy by the electron accelerator following the electron emitter. The high-energy electrons are then injected into the radiation device to generate an electron radiation. In practice, different radiation devices are applied to different radiation apparatus. For example, the radiation device of a free-electron laser (FEL) is an undulator; the radiation device of a Smith-Purcell radiator is a grating; the radiation device of a Cherenkov radiator is a dielectric, and the radiation device of a backward wave oscillator is a slow-wave waveguide.

The performance of electron radiation strongly depends on the characteristics of the driving electrons. It is known that the mechanism of electron radiation has two distinct regimes in terms of the electron bunch length relative to the radiation wavelength. Briefly if the electron bunch length is much longer than the radiation wavelength, the electrons generate incoherent radiation from the radiation device with a spectral energy linearly proportional to the electron current or to the total number of electrons. This incoherent radiation often occurs in synchrotron radiation. If the electron bunch length is much shorter than the radiation wavelength, the electrons radiate coherently in the so-called superradiance regime, where the spectral energy of the radiation has a quadratic dependence on the electron current or on the number of electrons.

Specifically, when a single electron transmits through a radiation device, the radiation energy carries the spectral characteristics of the radiation device. Regardless of the nature of the radiation device or scheme, let $(dW/d\omega)_1$ denote the spectral energy emitted from a single electron, where W is the radiation energy, $\omega$ is the angular frequency of the radiation, and subscript 1 denotes "a single electron". The total energy radiated from a stream of electrons in a radiation device is highly dependent on the electron bunch time $\tau_b$ relative to the radiation period $2\pi/\omega_r$ or on the electron bunch length $\sigma_b$ relative to the radiation wavelength $\lambda_r$ for relativistic electrons. If N electrons are uniformly distributed over several radiation wavelengths, the electrons radiate with all possible phases between 0 and $2\pi$ when transmitting through a radiation device, yielding a spectral energy expressed by:

$$(dW/d\omega)_{inc} = N(dW/d\omega)_1 \quad \text{Equation (1)}$$

Because not all the radiation fields from the electrons are added up constructively, this radiation process is incoherent. However, if $N_b$ electrons are distributed in a delta function in time or $\tau_b \sim 0$, all the radiation fields from the electrons are in phase and summed up constructively, resulting in a total spectral energy equal to $N_b^2(dW/d\omega)_1$. This radiation process is dubbed as superradiant emission or superradiance, having a radiation spectral energy proportional to the square of the number of electrons. To account for a finite electron bunch length $\tau_b$, the total spectral energy from an electron bunch is expressed by:

$$(dW/d\omega)_{SR} = N_b^2(dW/d\omega)_1 M_b^2(\omega), \quad \text{Equation (2)}$$

where $M_b(\omega)$ is the Fourier transform of the electron pulse-shape function with a unitary peak amplitude. If $N_{pb}$ such electron bunches repeat periodically at a rate $\omega_{pb}/2\pi$, the total radiated spectral energy is given by:

$$(dW/d\omega)_{SR,pb} = N_b^2 N_{pb}^2 (dW/d\omega)_1 M_b^2(\omega) M_{pb}^2(\omega), \quad \text{Equation (3)}$$

where $$M_{pb}^2(\omega) = \frac{\sin^2(N_{pb}\pi\omega/\omega_{pb})}{N_{pb}^2 \sin^2(\pi\omega/\omega_{pb})} \quad \text{Equation (4)}$$

is the coherent sum of the radiation fields from all the micro-bunches and has an unitary peak amplitude at the frequencies $\omega = m\omega_{pb}$ (m=1, 2, 3 ...). To have a large radiation spectral energy, one would like to have a short bunch length ($M_b^2(\omega) \sim 1$) and match the radiation frequency to one of the harmonics of the bunch frequency ($\omega = m\omega_{pb}$). For $\omega = m\omega_{pb}$ and $M_b^2(\omega) = 1$, the radiation spectral energy becomes $(dW/d\omega)_{SR,pb} = N_b^2 N_{pb}^2 (dW/d\omega)_1$, which indicates a quadratic dependence on the electron current. In many applications, a narrow spectral linewidth is important. For a short electron bunch, $M_b^2(\omega)$ is usually a broad-band function. The spectral linewidth of $M_{pb}^2(\omega)$ at $\omega = m\omega_{pb}$ is given by $\sim\omega_{pb}/N_{pb}$, which, for a large number of periodic electron bunches $N_{pb}$, could be much narrower than the intrinsic spectral linewidth of a radiation device governed by $(dW/d\omega)_1$. In this limit, the spectral linewidth of $(dW/d\omega)_{SR,pb} \propto (dW/d\omega)_1 M_{pb}^2(\omega)$ is approximately that of $M_{pb}^2(\omega)$ or $\sim\omega_{pb}/N_{pb}$ for a radiation frequency equal to $\omega = m\omega_{pb}$.

Refer to FIG. 1, which shows a schematic diagram of an electron radiation apparatus in the prior art. The electron radiation apparatus 100 includes a pulsed driver laser system 10, an electron emitter 13, an electron accelerator 14, and a radiation device 17. The assembly of the electron emitter 13 and the electron accelerator 14 is usually called a photocathode electron accelerator 12. The electron emitter 13 emits an electron pulse 15 when incident by a laser pulse 11 from the pulsed driver laser system 10, and the photoemitted electron pulse 15 is immediately accelerated to become a high-energy electron pulse 151. The electron radiation apparatus 100 further includes a beam transport system 16, wherein the high-energy electron pulse 151 is delivered through the beam transport system 16 and injected into the radiation device 17 for generating a radiation pulse 18. The beam transport system 16 could contain focusing and bending elements for electron-beam delivery or accelerators for further electron acceleration. Since the length of the laser pulse 11 and thus the length of the electron pulse 15 and the high-energy electron pulse length 151 are usually much longer than the wavelength of the radiation pulse 18, the spectral energy of the radiation pulse 18 can only follow the incoherent radiation Equation (1) in a synchrotron radiation device or could follow the Equations (2-4) in a radiation device equipped with some electron bunching scheme.

It is known that the electron superradiance can sometimes be generated from a single-pass type of radiation device such as Smith-Purcell radiator, a Cherenkov radiator, or an undulator radiator. The mechanism thereof is that the initially incoherent radiation field acts back the electrons to gradually form electron micro-bunches in the radiation device. The radiation power saturates at a high level when those micro-bunches are formed in the radiation field. However most single-pass electron radiators do not have enough radiation gain to reach the superradiance regime and saturate the radiation power. Electrons in a FEL oscillator can also form periodic bunches and radiate efficiently when the electromagnetic signal gradually builds up between the two resonator mirrors of the laser oscillator. Unfortunately a FEL oscillator is more complex than a single-pass undulator radiation device.

To assist the electron self-bunching, a short undulator with a drift distance or with a magnetic chicane is sometimes installed in front of a FEL oscillator. This short undulator is usually called an optical klystron, because a klystron as a microwave amplifier has a structure for inducing electron bunching. However, the optical klystron can only introduce very limited density modulation to an electron beam due to its weak spontaneous-radiation field in the short structure. In order to overcome the drawback of the optical klystron, a very long undulator is provided for a high-gain single-pass FEL for generating self-amplified spontaneous emission (SASE). Although this single-pass scheme avoids using resonator mirrors for a FEL, the undulator length has to be significantly longer than a conventional one and the electron beam quality (emittance, energy spread, and current density) driving the SASE FEL has to be much superior to those for an ordinary FEL oscillator. Furthermore, this single-pass FEL amplifies shot noises in the electrons and generates noisy spectral and temporal outputs.

To solve the noisy-output problem of a SASE FEL, a laser seeded modulator undulator in front of the SASE FEL is used to induce periodically bunched electrons with a bunch frequency equal to the sub-harmonic of the radiation frequency of the SASE FEL. However, this so-called high-gain harmonic-generation (HGHG) technique requires an investment on the modulator undulator and on a frequency-specific seed laser source. To reach a radiation wavelength much shorter than the laser wavelength, the HGHG scheme needs a large number of cascaded modulator and radiation undulator structures.

All the coherent electron radiation devices in prior arts simply adopt the electron current as is from an existing accelerator and rely on complex, expensive, or inefficient schemes external to an accelerator to bunch electrons for generating efficient electron radiation. Therefore, it is an intention of the present invention to provide a new electron accelerator and a new coherent radiation apparatus using such an accelerator to overcome the above-mentioned drawbacks in prior arts.

SUMMARY OF THE INVENTION

In accordance with one aspect of the present invention, an electron radiation apparatus employing a beat-wave laser system at the electron source is provided. The electron radiation apparatus includes a beat-wave laser system generating a laser beat wave, an electron emitter emitting a density-modulated electron current induced by the laser beat wave, an electron accelerator accelerating the density-modulated electron current and generating a periodically bunched electron beam, and a radiation device receiving the periodically bunched electron beam and generating an electron radiation.

Preferably, the beat-wave laser system generates a laser beat wave superimposed from $N \geq 2$ laser fields with a constant frequency shift $\Delta\omega/2\pi$, so that the laser beat wave has a beat frequency $\Delta\omega/2\pi$.

Preferably, the beat-wave laser system generates a laser beat wave superimposed from two frequency chirped laser fields with a relative time delay $\Delta t$ therebetween, so that the laser beat wave has a beat frequency determined by the relative time delay $\Delta t$ and the chirping rate of the two laser fields.

Preferably, the frequency of the electron radiation is matched to one of the harmonics of the bunching frequency of the periodically bunched electron beam.

Preferably, the electron radiation is an electron superradiance process with a spectral energy proportional to the square of the density-modulated electron current.

Preferably, the radiation device is one selected from a group consisting of an undulator, a grating, a dielectric and a slow-wave waveguide.

Preferably, the electron radiation apparatus is one selected from a group consisting of a free-electron laser (FEL), a Smith-Purcell radiator, a Cherenkove radiator, and a backward wave oscillator.

In accordance with another aspect of the present invention, a laser-beat-wave photocathode electron accelerator is provided, which includes a beat-wave laser system generating a laser beat wave, an electron emitter emitting a density-modulated electron current induced by the laser beat wave, an electron accelerator accelerating the density-modulated electron current and generating a periodically bunched electron beam.

In accordance with a further aspect of the present invention, a beat-wave laser system is provided, which generates a laser beat wave superimposed from $N \geq 2$ laser fields with a constant frequency shift $\Delta\omega/2\pi$, so that the laser beat wave has a beat frequency $\Delta\omega/2\pi$.

In accordance with an additional aspect of the present invention, a beat-wave laser system is provided, which generates a laser beat wave superimposed from two frequency chirped laser fields with a relative time delay $\Delta t$ therebetween, so that the laser beat wave has a beat frequency determined by the relative time delay $\Delta t$ and the chirping rate of the two laser fields.

Preferably, the electron density emitted from the photocathode follows the intensity envelope of the laser beat wave.

Additional objects and advantages of the invention will be set forth in the following descriptions with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 2:
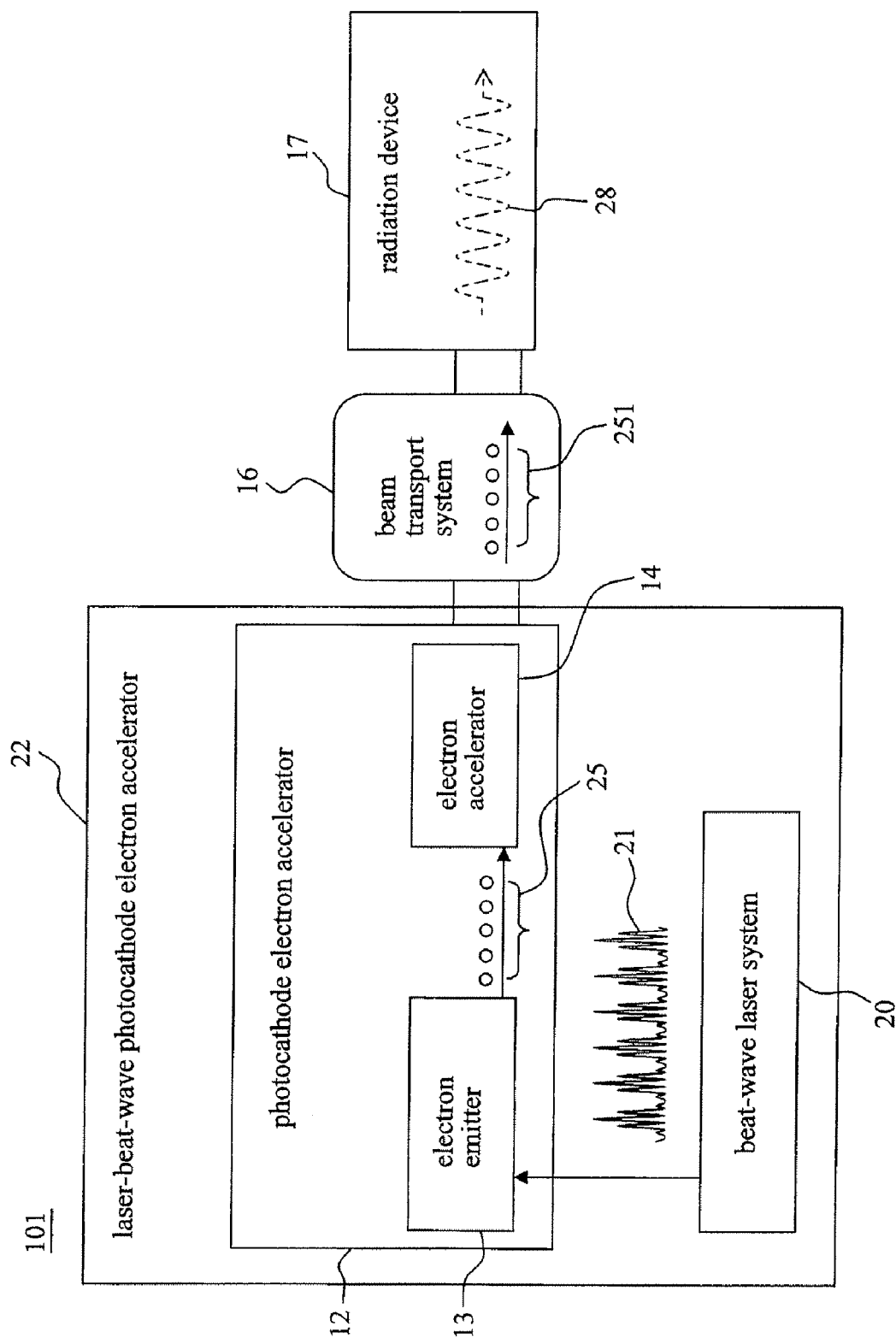
FIG. 2 shows the electron radiation apparatus according to a first preferred embodiment of the present invention.

Refer to FIG. 2, which shows the electron radiation apparatus according to a first preferred embodiment of the present invention. The electron radiation apparatus 101 includes a radiation device 17 and a laser-beat-wave photocathode electron accelerator 22 containing a beat-wave laser system 20 and a photocathode electron accelerator 12. The photocathode electron accelerator 12 includes an electron emitter 13 and electron accelerator 14, wherein the electron emitter 13 can be a photocathode 13. A laser beat wave 21 provided by the beat-wave laser system 20 is incident on the photocathode 13 to generate a density-modulated electron current 25. The amplitude of the density-modulated electron current 25 follows the periodic variation of the intensity envelope of the laser beat wave 21. The carrier frequency of the laser beat wave 21 is high enough so that the photon energy thereof can overcome the work function of the cathode material of the photocathode 13 for photoemission. The density-modulated electron current 25 is immediately accelerated to gain high energy in the subsequent electron accelerator 14 and converted into a periodically bunched electron beam 251. The electron radiation apparatus 101 further includes a beam transport system 16, and the periodically bunched electron beam 251 is injected into the radiation device 17 through the beam transport system 16 to generate an electron radiation 28 with high brightness. The frequency of the electron radiation 28 is matched to one of the harmonics of the bunching frequency of the periodically bunched electron beam 251, and thus the electron radiation 28 has a spectral energy proportional to the square of the density-modulated electron current 25.

Figure 3:
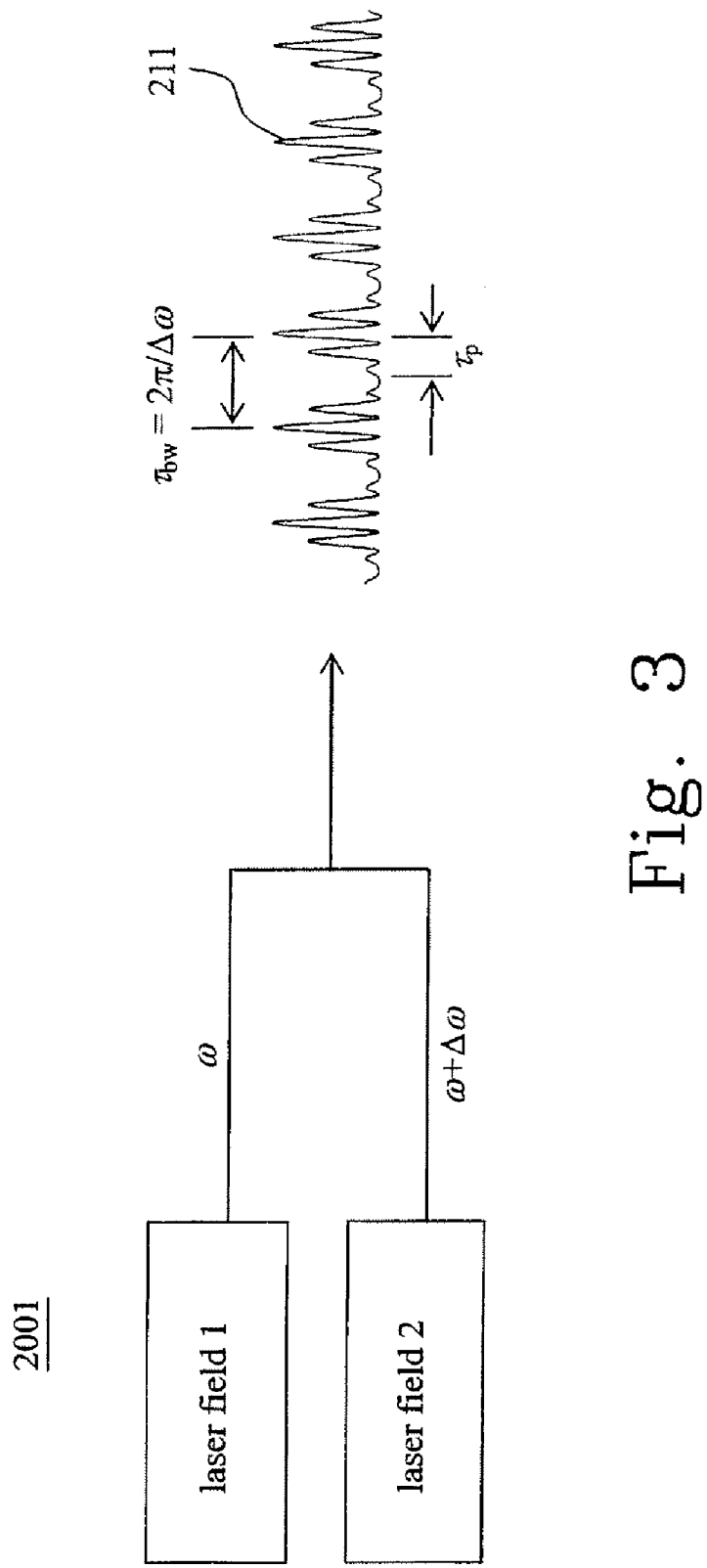
FIG. 3 is a schematic diagram showing the laser beat wave generated by the beat-wave laser system contains two laser fields with a constant frequency shift according to a second preferred embodiment of the present invention.

Refer to FIG. 3, which is a schematic diagram showing the laser beat wave generated by the beat-wave laser system containing two laser fields according to a second preferred embodiment of the present invention. The beat-wave laser system 2001 contains two laser fields 1 and 2 with angular frequencies $\omega$ and $\omega+\Delta\omega$, respectively. For an equal intensity in the two laser fields 1 and 2, the total instantaneous intensity of the laser beat wave 211 is given by:

$$I_{ins} = 8I_0 \cos^2\left[\left(\omega + \frac{\Delta\omega}{2}\right)t + \frac{\Delta\phi}{2}\right] \cdot \cos^2\left(\frac{\Delta\omega}{2}t + \frac{\Delta\phi}{2}\right), \quad \text{Equation (5)}$$

where $I_0$ is the root-mean-square intensity of each laser field, $\omega+\Delta\omega/2$ is the central frequency or the carrier frequency of the laser beat wave 211, $\Delta\omega t+\Delta\phi$ is the phase difference between the two laser fields 1 and 2, and t is a time variable.

Figure 1:
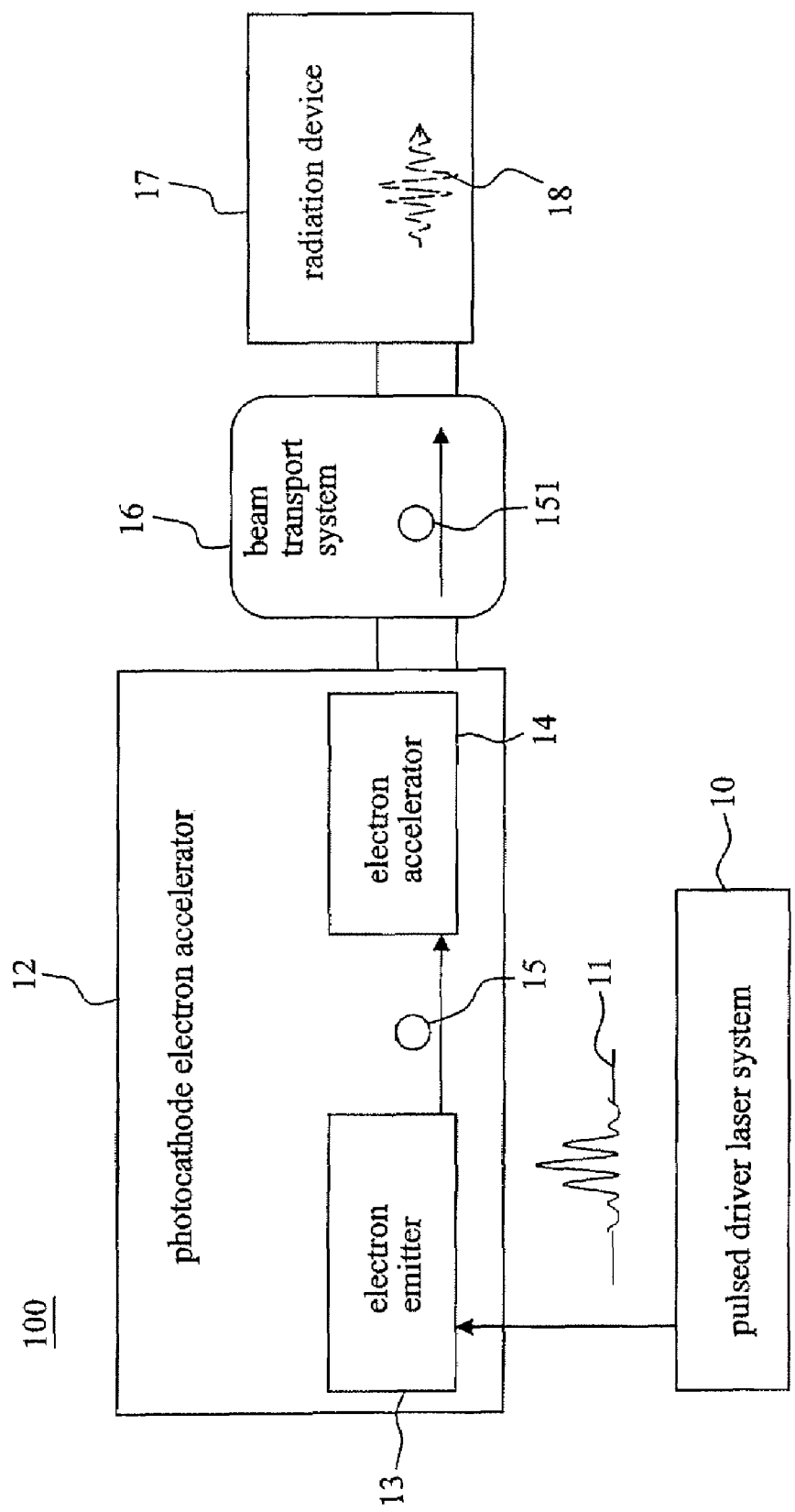
FIG. 1 is a schematic diagram showing an electron radiation apparatus in the prior art.

The fast carrier frequency is responsible for overcoming the work function of the photocathode 13 (shown in FIGS. 1 and 2), and the intensity envelope repeating at a beat frequency $\Delta\omega/2\pi=1/\tau_{bw}$ can provide density modulation to the emitted photocurrent at the photocathode 13, and hence the density-modulated electron current 25 shown in FIG. 2 can be generated from the photocathode 13. Moreover, the bunching frequency of the periodically bunched electron beam 251 shown in FIG. 2 is adjustable by changing the frequency difference $\Delta\omega/2\pi$ between laser fields 1 and 2.

Figure 4:
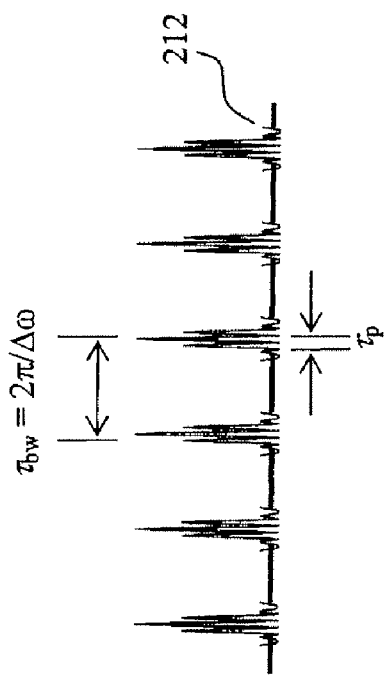
FIG. 4 is a schematic diagram showing the laser beat wave generated by the beat-wave laser system contains N laser fields (where $N \geq 2$) with a constant frequency shift according to a third preferred embodiment of the present invention.
Figure 4:
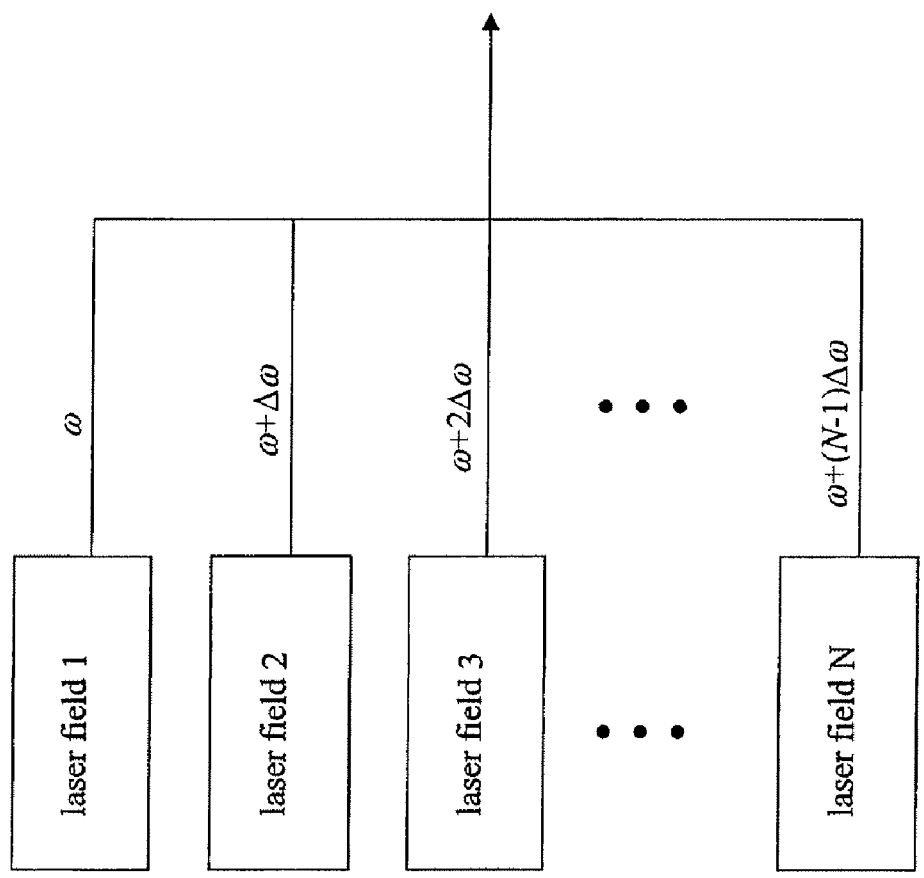

Refer to FIG. 4, which is a schematic diagram showing the laser beat wave generated by the beat-wave laser system containing N laser fields (where $N \geq 2$) according to a third preferred embodiment of the present invention. The beat-wave laser system 2002 contains laser fields 1, 2, and N having a constant frequency shift $\Delta\omega/2\pi$. For equal-amplitude and phase-locked N fields, the coherent sum of all the laser fields 1, 2, . . . , and N gives a laser beat wave 212 with an instantaneous beat-wave intensity expressed by $$I_{ins} = 2m^2 I_0 \cos^2[\omega t + (N-1)(\Delta\omega t + \Delta\phi)/2] \cdot \quad \text{Equation (6)}$$

$$\frac{\sin^2 \frac{N(\Delta\omega t + \Delta\phi)}{2}}{m^2 \sin^2 \frac{(\Delta\omega t + \Delta\phi)}{2}},$$

or a time-averaged beat-pulse envelope expressed by $$I_{avg} = N^2 I_0 \frac{\sin^2 \frac{N(\Delta\omega t + \Delta\phi)}{2}}{N^2 \sin^2 \frac{(\Delta\omega t + \Delta\phi)}{2}}, \quad \text{Equation (7)}$$

where all the laser-field components are locked to a constant phase shift $\Delta\omega t+\Delta\phi$. Equation (7) clearly shows that the laser beat wave 212 repeats at a frequency $\Delta\omega/2\pi$ with a pulse width a factor of N reduced from that of the two-field laser beat wave 211 shown in FIG. 3. By varying the number of interfering waves N, the beat-pulse width of the laser beat wave 212 can be adjusted to optimize the modulation depth of the density-modulated electron current 25 emitted from the photocathode 13 as shown in FIG. 2.

Figure 5:
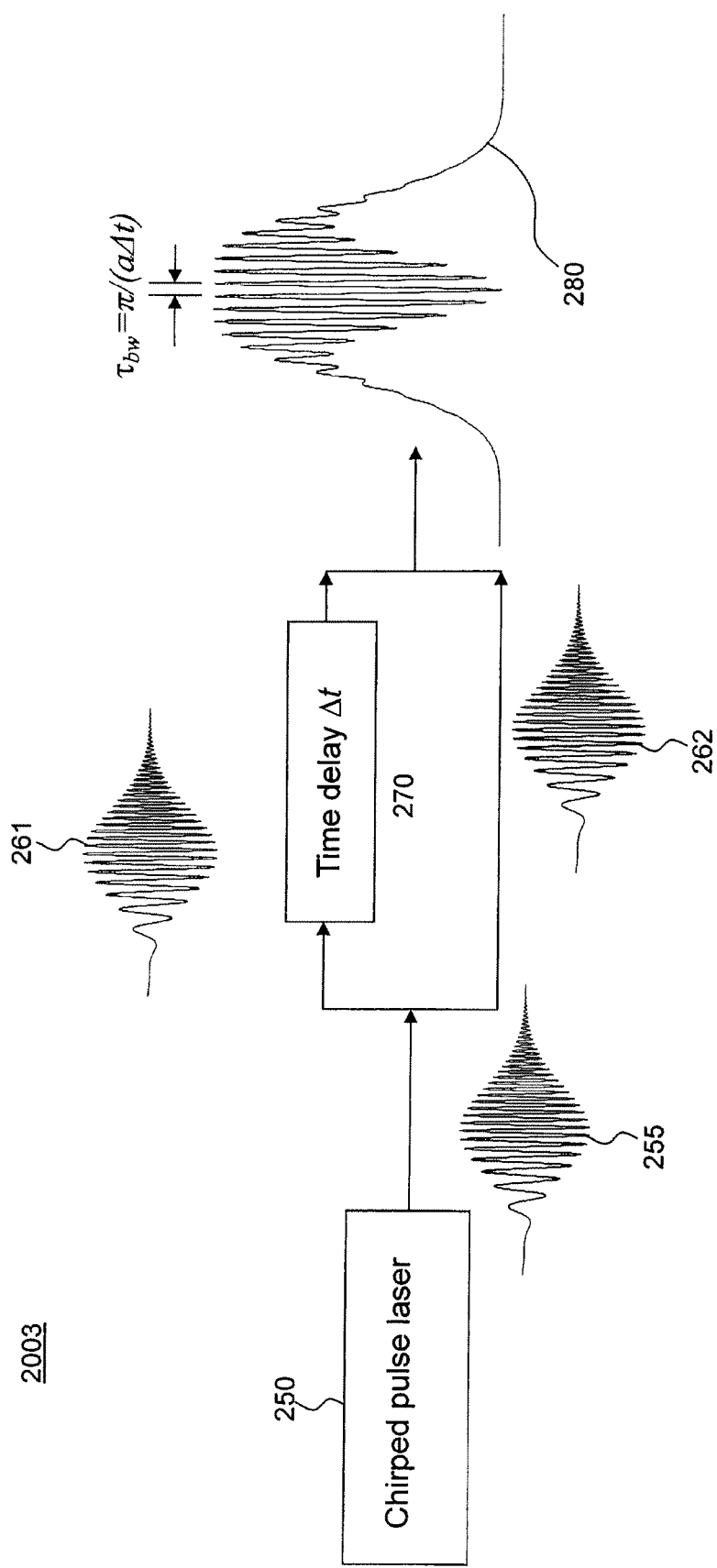
FIG. 5 is a schematic diagram showing the laser beat wave generated by the beat-wave laser system containing two frequency chirped laser fields with a relative time delay according to a fourth preferred embodiment of the present invention.

Refer to FIG. 5, which is a schematic diagram showing the laser beat wave generated by the beat-wave laser system 2003 containing two frequency chirped laser fields according to a fourth preferred embodiment of the present invention. The two frequency chirped laser fields 261 and 262 are derived from a pulsed laser source 250 producing a frequency chirped laser pulse 255. The pulsed laser source 250 can be a typical mode-locked laser, such as a mode-locked Ti:sapphire laser, a mode-locked Yb laser, or a mode-locked Nd laser. There is a relative time delay $\Delta t$ 270 between the two frequency chirped laser fields 261, 262. For equal power splitting from the laser pulse 255, the complex amplitudes of the two laser fields 261, 262 with a carrier frequency $\omega$ can be expressed by $\sqrt{I_0} e^{-t^2/\tau^2} e^{j\omega t + ja t^2 + j\phi}$ and $\sqrt{I_0} e^{-t^2/\tau^2} e^{j\omega(t+\Delta t) + ja(t+\Delta t)^2 + j\phi}$, where $\tau$ is the pulse width of the laser pulse, a is a constant describing the frequency chirping rate, and $\phi$ is an arbitrary phase. The recombination of the two frequency chirped pulses results in a beat-wave laser pulse 280 with an oscillating intensity envelope governed by $\cos^2[(a\Delta t)t + \Phi]$, where $\Phi$ is a constant phase determined by the time delay $\Delta t$, the carrier frequency $\omega$, and a. Therefore adjusting the time delay of the two chirped pulses Δt, and the chirping rate a also tunes the beat frequency of the beat-wave laser pulse, aΔt/π, and thus tunes that of the density modulation of the photocurrent 25 in FIG. 2.

Figure 6:
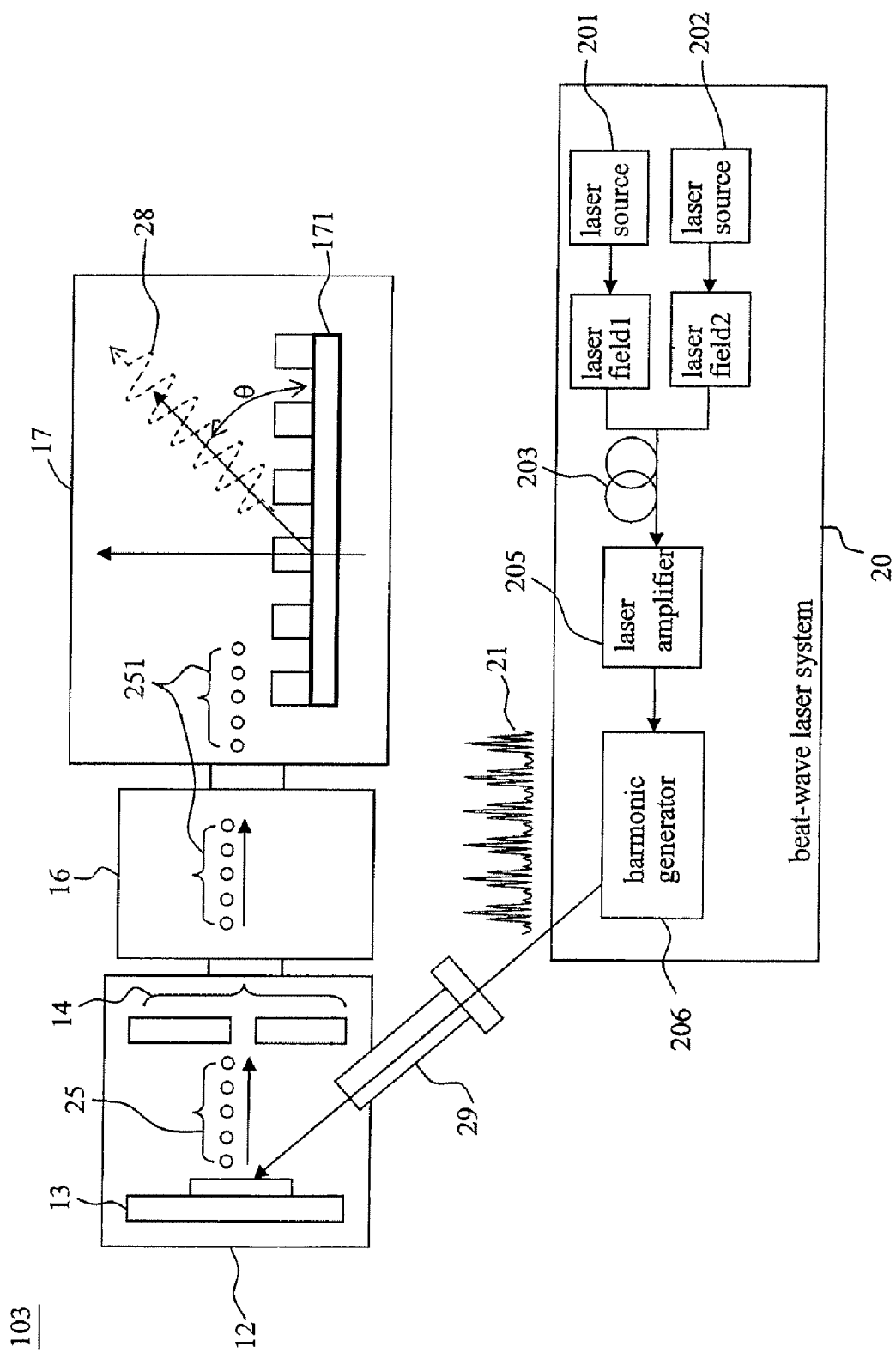
FIG. 6 shows the electron radiation apparatus being as a Smith-Purcell radiator according to a sixth preferred embodiment of the present invention.

As a design example, FIG. 6 shows the electron radiation apparatus being as a Smith-Purcell radiator emitting an electromagnetic radiation at a 1 THz frequency according to a fifth preferred embodiment of the present invention. The electron radiation apparatus 103 includes a beat-wave laser system 20, a photocathode accelerator 12, a beam transport system 16, and a radiation device 17. The photocathode accelerator contains a photocathode 13 for emitting photoelectrons and an anode 14 for establishing an electric field for electron acceleration.

In this design example, the beat-wave laser system begins with two continuous-wave (CW) seed lasers. The first seed laser 201 is a distributed-feedback diode laser emitting at a fixed 1538.98 nm. The second seed laser 202 is a wavelength tunable diode laser or more specifically an external-cavity diode laser with a wavelength tuning range between 1520 and 1600 nm. These two diode lasers are commonly found in optical communication for a communication band between 1200 and 1600 nm. For example, the first seed diode laser 201 emits one of the so-called ITU (International Telecommunication Union) wavelengths, and the second seed laser 202 has a wavelength tuning range covering the lowest-loss spectrum of an optical fiber for telecommunications. The seed laser 202 is tuned to a wavelength 1542.93 nm to provide the 0.5 THz frequency offset with respect to the frequency of the seed laser 201. The two seed laser signals are combined in a fiber coupler 203 and send into a laser amplifier 205 consisting of an Erbium doped fiber amplifier and a pulsed optical parametric amplifier (OPA).

The Erbium doped fiber amplifier amplifies the CW beat wave power to about 40 mW, with 20 mW in each of the two laser fields 1 and 2. The pulsed OPA further boosts up the total beat-wave laser energy to 20 µJ/pulse in 1-ns time duration. The OPA is pumped by a 1064-nm Q-switched Nd:YAG laser that generates 150 kW peak power over ~1 ns pulse width with a pulse rate of 1 kHz. The OPA adopts a 3-cm long periodically poled lithium niobate (PPLN) crystal as its gain medium. The PPLN crystal has a quasi-phase-matching period of 29.68 µm that permits the amplification of the two laser fields 1 and 2 at 97 deg C. with a pump wavelength at 1064 nm. The amplified laser-beat-wave pulses are then frequency doubled to 769.49 and 771.46 nm (frequency offset=1 THz) in the laser harmonic generator 206 with approximately 50% energy conversion efficiency for each of the two laser fields 1 and 2. The frequency-doubled laser beat wave 21 is sent into the photocathode 13 of the photocathode accelerator 12 through a vacuum port 29. Adjusting the wavelength or frequency of the laser field 2 with respect to that of the laser field 1 can adjust the beat frequency of the laser beat wave.

The photocathode 13 is a GaAs photocathode, and the photocathode 13 and the anode 14 are biased to a voltage variable between 10-60 kV. The photon energy of the ~750-nm-wavelength photons in the laser beat wave 21 is sufficient for inducing intensity-modulated photoemission from the GaAs photocathode 13. The emitted density-modulated electron current 25 is then accelerated toward the anode 14 and converted into a high-energy periodically bunched electron beam 251. The high-energy periodically bunched electron beam 251 enters the beam transport system 16 through the anode aperture. For a quantum efficiency of 0.5, the 10 µJ/pulse, 1-ns pulse-width laser beat wave is capable of generating $2 \times 10^{13}$ electrons in the 1-ns duration or $2 \times 10^{10}$ electrons in each 1-ps beat pulse.

A GaAs photocathode usually requires ultra-high vacuum and has an emission time constant near or longer than 1 ps. Another design example for the photocathode accelerator is to adopt a fast responding Cu photocathode. To induce photoemission from a Cu cathode, the beat-wave laser at about 770 nm wavelength is further frequency tripled to the ultraviolet (UV) wavelength in the harmonic generator. With the aforementioned design parameters for components 201~205, the total output energy for the UV laser beat wave is approximately 2 µJ/pulse over ~1-ns pulse width for ~10% conversion efficiency for a third-harmonic generator. To maintain the 1-THz beat frequency in the UV laser beat wave, the frequency offset between the two seed diode lasers is adjusted to 1 THz/6 to account for the beat-frequency increase due to the sextupled laser frequency in the laser harmonic generator. If there is cross mixing of the two beat-wave fields in the harmonic generator, N>2 laser fields are generated with a frequency shift equal to the original frequency offset. In this situation, the initial frequency offset of the two seed diode lasers should be set to 1 THz. With a conservative quantum efficiency of $2.5 \times 10^{-6}$ for a copper cathode, the 1 µJ/pulse UV laser beat wave is capable of generating $6.5 \times 10^6$ electrons in the 1-ns duration or $6.5 \times 10^3$ electrons in each 1-ps beat pulse.

Figure 7A:
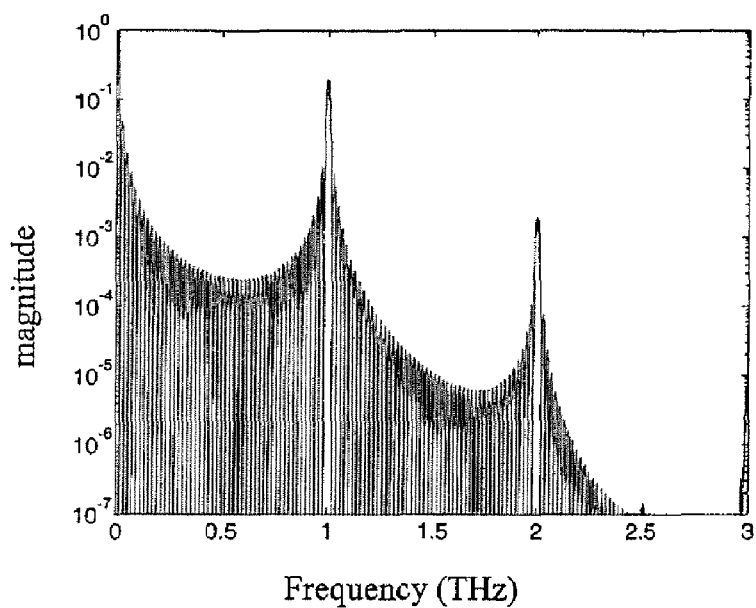
FIG. 7(a) shows the spectral contents of the density-modulated electron current at the electron emitter of the electron radiation apparatus of FIG. 7.
Figure 7B:
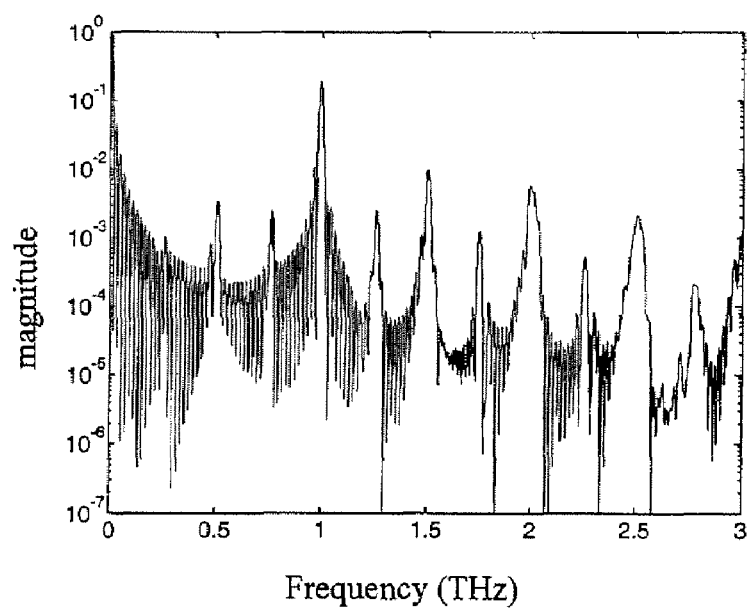
FIG. 7(b) shows the spectral contents of the periodically bunched electron beam at the output of the electron accelerator of the electron radiation apparatus of FIG. 6.

The design simulation for the accelerator is done by a space charge tracking code, called ASTRA, developed by Floettmann at the German Electron Synchrotron Facility, DESY. In the design simulation, the photocathode emits 50 Gaussian electron bunches each having a 0.2-ps rms bunch length over a 50-ps time period. Each electron bunch contains 1 fC charge or $6.5 \times 10^3$ electrons, resulting in a 1-mA average current over the 50-ps period. The electrons are distributed uniformly over an rms cathode radius of 0.3 mm. The electrons are confined in a 1-T axial magnetic field and accelerated toward the anode to gain 42-keV energy in a 4.5-cm distance. FIGS. 7(a) and 7(b) shows the spectral content $M_b^2(\omega)M_{pb}^2(\omega)$ for the emitted electrons at the cathode and the 42-keV output electrons from the accelerator, respectively.

By comparing FIGS. 7(a) and 7(b), it is seen that the integrity of the periodic electron bunches is well maintained during electron acceleration. Although the accelerated electrons are slightly re-distributed in time due to the space charge force, the enhancement in the spectral energy due to the periodic bunching is apparent at the harmonics of the bunching frequencies. In particular the magnitudes of $M_b^2(\omega)M_{pb}^2(\omega)$ at the first harmonic frequency, 1 THz, before and after electron acceleration are nearly the same.

The purpose of the beam transport system 16 is to deliver an electron beam with a suitable beam size and divergence angle to an appropriate location in the radiation device 17. For low energy electrons, the beam transport system 16 may employ electrostatic lenses and deflectors for beam focusing and deflecting, respectively.

The radiation device 17 in the downstream for this electron radiation apparatus 103 is a Smith-Purcell radiator. The Smith-Purcell radiator employs a metal grating 171 and generates a radiation 28 at some angle from the grating surface when the periodically bunched electron beam 251 traverses slight above the metal grating 171. The radiation wavelength of a Smith-Purcell radiator is governed by the expression:

$$\lambda_r = \Lambda(1/\beta - \cos\theta)/m, \qquad \text{Equation (8)}$$

where $\Lambda$ is the grating period, $\beta$ is the electron velocity normalize to the vacuum wave velocity, $\theta$ is the emission angle from the grating surface, and m is the diffraction order. For a 42-keV electron beam to emit 1-THz radiation at 45 degrees from the grating surface with m=1, the period of the Smith-Purcell grating can be 157 µm, according to Equation (8). With $6.25 \times 10^3$ electrons/bunch and 1000 bunches during a 1 ns period from the Cu photocathode accelerator, the spectral energy of the Smith-Purcell Radiation is coherently enhanced by a factor of $6.25 \times 10^3 \times 1000$ or by almost 7 orders of magnitude at 1 THz when compared with that of an unbunched electron beam.

Notably, although the above electron radiation apparatus according the fifth embodiment is a Smith-Purcell Radiator but is not limited thereto. In other words, the electron radiation apparatus according to the present invention can also be a free-electron laser, a Cherenkove radiator, or a backward wave oscillator when the radiation device employed is an undulator, a dielectric or a slow-wave waveguide, respectively. In addition, based on the different requirements and the characteristics of the laser fields, the laser amplifier employed in the electron radiation apparatus according to the present invention can be a linear laser amplifier, or a nonlinear laser amplifier. A nonlinear laser amplifier includes an optical parametric amplifier or a Raman amplifier. A nonlinear laser amplifier can generate $N \geq 2$ laser fields with a constant frequency shift $\Delta\omega/2\pi$ through cascading nonlinear frequency mixing. The medium of the nonlinear laser amplifier can be made from a group of second-order and third-order nonlinear optical materials, including Raman, optical parametric, and plasma materials.

In conclusion, the superradiance from a periodically bunched electron beam is advantageous in generating high-brightness electromagnetic radiations. The electron radiation apparatus using the laser-beat-wave photocathode electron accelerator provided by the present invention can effectively overcome the drawbacks in and greatly improve the radiation performance of the prior art.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An electron radiation apparatus comprising:
   a beat-wave laser system generating a laser beat wave;
   an electron emitter emitting a density-modulated electron current induced by the laser beat wave;
   an electron accelerator accelerating the density-modulated electron current and generating a periodically bunched electron beam; and
   a radiation device receiving the periodically bunched electron beam and generating an electron radiation.

2. An electron radiation apparatus according to claim 1, wherein the beat-wave laser system further comprises $N \geq 2$ laser fields with a constant frequency shift $\Delta\omega/2\pi$ for generating the laser beat wave superimposed therefrom, so that the laser beat wave has a beat frequency $\Delta\omega/2\pi$.

3. An electron radiation apparatus according to claim 1, wherein the beat-wave laser system further comprises two frequency chirped laser fields with a relative time delay $\Delta t$ therebetween for generating the laser beat wave superimposed therefrom, so that the laser beat wave has a beat frequency tuned by the relative time delay $\Delta t$ and a chirping rate of the two laser fields.

4. An electron radiation apparatus according to claim 1, wherein a bunching frequency of the periodically bunched electron beam is adjustable by varying a beat frequency of the laser beat wave.

5. An electron radiation apparatus according to claim 1, wherein a frequency of the electron radiation is matched to one of integer multiples of a bunching frequency of the periodically bunched electron beam.

6. An electron radiation apparatus according to claim 1, wherein the electron radiation is an electron superradiance with a spectral energy proportional to the square of the density-modulated electron current.

7. An electron radiation apparatus according to claim 1, wherein the radiation device is one selected from a group consisting of an undulator, a grating, a dielectric and a slow-wave waveguide.

8. An electron radiation apparatus according to claim 1, being used as one selected from a group consisting of a free-electron laser, a Smith-Purcell radiator, a Cherenkove radiator, and a backward wave oscillator.

9. A laser-beat-wave photocathode electron accelerator, comprising:
   a beat-wave laser system generating a laser beat wave;
   an electron emitter emitting a density-modulated electron current induced by the laser beat wave; and
   an electron accelerator accelerating the density-modulated electron current and generating a periodically bunched electron beam.

10. A laser-beat-wave photocathode electron accelerator according to claim 9, wherein the beat-wave laser system further comprises $N \geq 2$ laser fields with a constant frequency shift $\Delta\omega/2\pi$ for generating the laser beat wave superimposed therefrom, so that the laser beat wave has a beat frequency $\Delta\omega/2\pi$.

11. A laser-beat-wave photocathode electron accelerator according to claim 9, wherein the beat-wave laser system further comprises two frequency chirped laser fields with a relative time delay $\Delta t$ therebetween for generating the laser beat wave superimposed therefrom, so that the laser beat wave has a beat frequency tuned by the relative time delay $\Delta t$ and a chirping rate of the two laser fields.

12. A laser-beat-wave photocathode electron accelerator according to claim 9, a bunching frequency of the periodically bunched electrons is adjustable by varying a beat frequency of the laser beat wave.

13. A beat-wave laser system, comprising $N \geq 2$ laser fields for generating a laser beat wave superimposed therefrom.

14. A beat-wave laser system according claim 13, wherein the $N \geq 2$ laser fields have a constant frequency shift $\Delta\omega/2\pi$, so that the laser beat wave has a beat frequency $\Delta\omega/2\pi$.

15. A beat-wave laser system according to claim 14 further comprising two diode lasers, wherein when N=2, the two laser fields are generated from a mixing of the two diode lasers in an optical communication band between 1200 and 1600 nm.

16. A beat-wave laser system according to claim 14, wherein the $N \geq 2$ laser fields are generated from a nonlinear frequency mixing in a group consisting of second-order and third-order nonlinear optical materials.

17. A beat-wave laser system according claim 13, wherein when N=2, the two laser fields are frequency chirped laser fields with a relative time delay $\Delta t$ therebetween, so that the laser beat wave has a beat frequency tuned by the relative time delay $\Delta t$ and a chirping rate of the two laser fields.

18. A beat-wave laser system according to claim 17 further comprising a mode-locked laser source, wherein the two laser fields are split from another frequency chirped laser field generated from the mode-locked laser source.

* * * * *